(12) United States Patent
Nielsen

(10) Patent No.: US 9,754,488 B2
(45) Date of Patent: Sep. 5, 2017

(54) METHOD AND SYSTEM FOR GENERATING AN ALARM SIGNAL IN A VEHICLE

(71) Applicant: VOLVO CAR CORPORATION, Gothenburg (SE)

(72) Inventor: Jon Werk Nielsen, Kobenhavn N (DK)

(73) Assignee: Volvo Car Corporation, Gothenburg (SE)

( * ) Notice: Subject to any disclaimer, the term of this patent is extended or adjusted under 35 U.S.C. 154(b) by 98 days.

(21) Appl. No.: 14/729,255

(22) Filed: Jun. 3, 2015

(65) Prior Publication Data
US 2016/0005317 A1 Jan. 7, 2016

(30) Foreign Application Priority Data

Jul. 3, 2014 (EP) .................................... 14175526

(51) Int. Cl.
*B60Q 1/00* (2006.01)
*G08G 1/16* (2006.01)
*B60Q 9/00* (2006.01)

(52) U.S. Cl.
CPC ............. *G08G 1/165* (2013.01); *B60Q 9/007* (2013.01); *B60Q 9/008* (2013.01)

(58) Field of Classification Search
CPC ........ B60Q 1/525; B60Q 9/008; B60Q 9/007; G08G 1/16; G08G 1/165; G01S 13/931; G01S 15/931
USPC .............................. 340/425.5, 435, 436, 438
See application file for complete search history.

(56) References Cited

U.S. PATENT DOCUMENTS

| | | | | |
|---|---|---|---|---|
| 5,724,313 A | * | 3/1998 | Burgess | A61H 3/061 367/102 |
| 6,114,950 A | * | 9/2000 | Schaible | B60Q 9/007 340/435 |
| 8,483,903 B2 | * | 7/2013 | Tengler | G01C 21/26 340/435 |
| 2008/0167781 A1 | | 7/2008 | Labuhn et al. | |
| 2011/0298639 A1 | * | 12/2011 | Kadowaki | B62D 15/027 340/932.2 |
| 2015/0356837 A1 | * | 12/2015 | Pajestka | A61H 3/061 340/4.14 |

FOREIGN PATENT DOCUMENTS

| | | |
|---|---|---|
| DE | 19843367 | 3/2000 |
| EP | 1686007 | 8/2006 |
| EP | 2166525 | 3/2010 |

(Continued)

OTHER PUBLICATIONS

Extended European Search Report for EP 14175526.4, Completed by the European Patent Office, Dated Dec. 23, 2014, 7 Pages.

*Primary Examiner* — Mark Rushing
*Assistant Examiner* — Anthony D Afrifa-Kyei
(74) *Attorney, Agent, or Firm* — Brooks Kushman P.C.

(57) ABSTRACT

A method is provided for generating an alarm signal in a vehicle for indicating that the vehicle is in the proximity of an object includes detecting a degree of proximity to the object, calculating a value of the distance (d) between the vehicle and the object, generating the alarm signal at least as an audio signal when the distance (d) is less than a predetermined first threshold value ($d_1$), and generating the alarm signal in the form of a sequence of signal stages as the distance (d) decreases. A system is also provided for generating an alarm signal in a vehicle.

14 Claims, 2 Drawing Sheets

(56) References Cited

FOREIGN PATENT DOCUMENTS

| WO | 9505649 | 2/1995 |
|----|---------|--------|
| WO | 9702155 | 1/1997 |
| WO | 2005063525 | 7/2005 |

* cited by examiner

METHOD AND SYSTEM FOR GENERATING AN ALARM SIGNAL IN A VEHICLE

CROSS-REFERENCE TO RELATED APPLICATIONS

This application claims foreign priority benefits under 35 U.S.C. §119(a)-(d) to European patent application number EP 14175526.4, filed Jul. 3, 2014, which is incorporated by reference in its entirety.

TECHNICAL FIELD

The disclosure relates to a method for generating an alarm signal in a vehicle for indicating that said vehicle is in the proximity of a further object, said method comprising: detecting a degree of proximity to said object; calculating a value of the distance between said vehicle and said object; and generating said alarm signal at least as an audio signal when said distance is less than a predetermined first threshold value.

The disclosure also relates to a system for generating an alarm signal in a vehicle for indicating that said vehicle is in the proximity of a further object, said system comprising at least one detector unit configured for detecting a degree of proximity to said object and a control unit configured for calculating a value of the distance between said vehicle and said object and for generating said alarm signal in at least an audible manner if said distance is less than a predetermined first threshold value.

The disclosure can be used in different types of vehicles, such as cars, buses, heavy transport vehicles and other types of vehicles.

BACKGROUND

In the field of vehicles, there are today high requirements as regards safety and comfort for drivers and passengers of road vehicles. For example, it is common that cars are equipped with systems which are arranged for generating an alarm signal to alert the driver of a car if the car is close to another object. Such systems are referred to as parking assist systems, and are useful for a driver for example during a parking maneouvre while driving in reverse gear.

A parking assist system comprises a number of proximity sensors which are positioned at least in a rear section of the vehicle in question. The proximity sensors are normally of ultrasonic type and are configured for emitting ultrasonic pulses which are reflected off any object which is close to the vehicle. The reflected pulses can be detected by a control unit in the vehicle. The control unit then provides a measure of the distance between the vehicle and the object and generates an alarm signal, in the form of an audio signal, in the event that the distance between the vehicle and the object should become less than a predetermined threshold value.

It is particularly important that this audio signal is generated in a manner so that it can be clearly audible to the driver of the vehicle. Also, the signal must be generated in a form which attracts the attention of the driver so that he or she gets an impression of urgency, i.e. so that the driver reacts to the signal by acting so as to avoid driving into the object. The signal must also be discriminable from other audio signals and sounds in and around the vehicle. In this manner, the driver can be guided through the reverse parking procedure so as to park the vehicle in a safe manner.

To solve the above-mentioned requirements, there is today known a parking assist system which generates an alarm signal in the form of a series of successive audio tones wherein, for example, the tones are generated faster and faster in order to indicate an increasing proximity to the object. Also, the frequency of each tone may be a measure of the actual distance to the object. Also, the alarm signal may be in the form of a continuous tone which indicates a minimum distance to the object at which the vehicle needs to be stopped immediately in order to prevent the vehicle from running into the object.

A disadvantage with today's technology for parking assist systems is that the alarm signal which is generated during a parking maneouvre may cause stress to the driver due to the nature of the signal. This is unfortunate, in particular since the driver may already be in a stressful situation. An extra stress factor can consequently be added by the parking assist system, which may increase the risk for a driver to crash into an object close to the vehicle.

In order for a driver to clearly observe such audio signals, it is important to generate them in a form which is sensed and interpreted by a driver in a manner which is intuitive and logic as regards the acoustic design of the audio signals. In this manner, the driver may react to the signals in a quick and natural manner so as to respond in an optimum manner to the situation wherein the vehicle approaches an object.

The patent document US 2008/167781 teaches a system which is arranged to emit a cautionary alert, for example a flashing light or an audio signal, when a distance between a vehicle and an obstacle is less than a threshold value. A further warning signal can be generated when the vehicle is even closer to the obstacle.

The patent document EP 1686007 discloses a method for providing an audio signal in a vehicle during a parking maneouvre, wherein a degree of criticality during the maneouvre corresponds to an available parking space length. The audio signal is generated in the form of a polyphonic sound, i.e. a number of musical tones of predetermined frequency (i.e. pitch) being played simultaneously. The harmony of the polyphonic sound, i.e. the property of the sound which corresponds to how "musical" or "well-sounding" is sounds to the human ear, is chosen on the basis of the degree of criticality. This means that an increasing criticality, i.e. corresponding to a decreasing distance between the vehicle and a further object, leads to a polyphonic sound which is more and more non-harmonic and dissonant, i.e. sounding more and more "non-musical" and "non-pleasant" to listen to, whereas an increasing distance between the vehicle and said further object leads to a polyphonic sound which is more and more harmonic, i.e. more "musical" and "well-sounding".

Although the system shown in EP 1686007 is based on a concept of generating an alarm signal which can be perceived by a driver as an indication of an urgent situation, it should be noted that it is based on musical theory and generation of a polyphonic sound, i.e. a number of musical tones played simultaneously and each having a particular pitch. Such musical alarm signals may not always be perceived as intuitive and ergonomic to a driver.

Consequently, although the above-mentioned patent document suggest a solution to the problem of providing an improved alarm signal, there is a continuing need for improved parking assist systems which are more intuitive and ergonomically well-functioning manner for a driver.

SUMMARY

Consequently, an object of the disclosure is to provide a method which solves the above-mentioned problems related to prior art and provides a solution which is more intuitive, comfortable and ergonomically well-functioning than previous solutions, while still being perceived as an alarm signal which indicates urgency and in need of driver attention.

The above-mentioned object is achieved by a method for generating an alarm signal in a vehicle for indicating that said vehicle is in the proximity of a further object, said method comprising: detecting a degree of proximity to said object; calculating a value of the distance between said vehicle and said object; and generating said alarm signal at least as an audio signal when said distance is less than a predetermined first threshold value. In accordance with the disclosure, the method further comprises: generating said alarm signal in the form of a sequence of signal stages as said distance decreases; wherein a first signal stage is generated in the form of a combination of an audio signal and a vibratory signal causing vibrations in a steering wheel in the vehicle, and a second signal stage is generated in the form of an audio signal gradually increasing in volume as the distance between the vehicle and the object decreases.

The disclosure provides certain advantages over previously known technology, primarily due to the fact that it is used for generating an alarm signal which is perceived in manner which is logic and natural and which reduces the risk of causing stress for a driver while still generating a notion of alert and urgency to the driver.

According to an embodiment, the method further comprises generating said first signal stage in the form of a brief vibratory signal combined with an audio signal in the form of a relatively low volume beep. Also, according to an embodiment, the method comprises generating said second signal stage in the form of an audio signal with gradually increasing volume and treble, and with a gradually decreasing level of reverb, as the distance between the vehicle and the object decreases. This provides an advantage since the alarm signal is interpreted in a manner which is intuitive to human ergonomics.

Furthermore, according to an embodiment, the method comprises generating a third signal stage in the form of a combination of a vibratory signal causing vibrations in the steering wheel and an audio signal being of higher volume than during said first signal stage. Such a third signal stage will then follow after the first and second stages and gives the driver an indication that the vehicle needs to be stopped immediately in order to avoid a collision.

According to an embodiment, the method comprises generating said third signal stage with a continuous vibratory signal combined with an audio signal in the form of a relatively high volume beep.

The above-mentioned object is also obtained by means of a system for generating an alarm signal in a vehicle for indicating that said vehicle is in the proximity of a further object. The system comprises at least one detector unit configured for detecting a degree of proximity to said object, and a control unit configured for calculating a value of the distance between said vehicle and said object and for generating said alarm signal in at least an audible manner if said distance is less than a predetermined first threshold value. Furthermore, the system comprises alarm units for generating said alarm signal in the form of a sequence of signal stages as said distance decreases; wherein said control unit is configured for generating a first signal stage in the form of a combination of an audio signal and a vibratory signal causing vibrations in a steering wheel in the vehicle; and a second signal stage in the form of an audio signal gradually increasing in volume as the distance between the vehicle and the object decreases.

According to an embodiment, the system is arranged so that the control unit is configured for generating an alarm signal having a third signal stage in the form of a combination of a vibratory signal causing vibrations in the steering wheel and an audio signal being of higher volume than during said first signal stage.

The disclosure can be applied in different types of vehicles, such as cars, trucks, buses and construction equipment. Although the disclosure will be described with respect to an application in the form of a car, the disclosure is not restricted to this particular type of vehicle, but may be used in other vehicles.

Further advantages and advantageous features of the disclosure are set forth in the following description and claims.

BRIEF DESCRIPTION OF THE DRAWINGS

With reference to the appended drawings, below follows a more detailed description of embodiments of the disclosure cited as examples.

DETAILED DESCRIPTION

Figure 1:
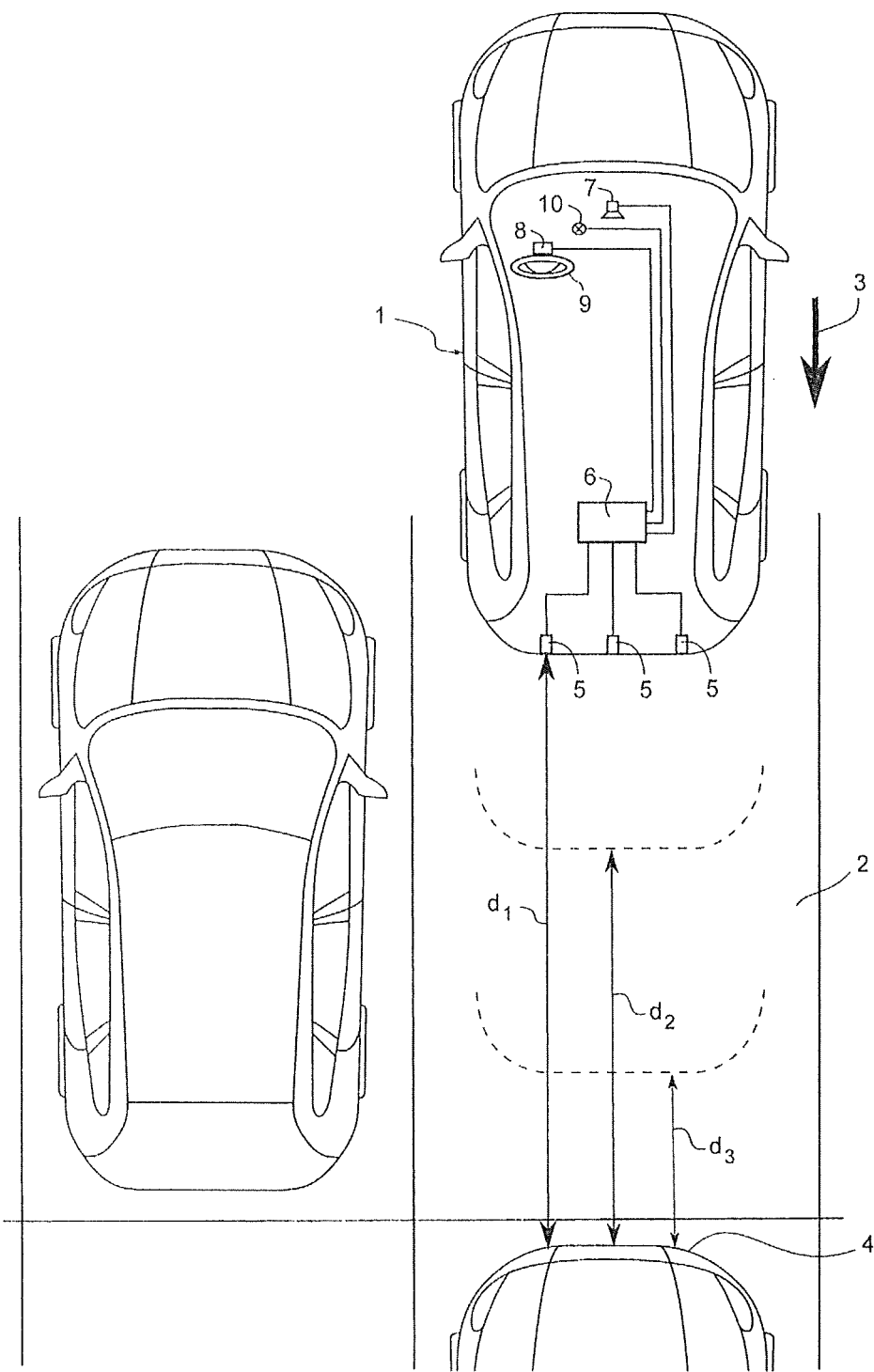
FIG. 1 shows a first embodiment of the disclosure with reference to a schematic top view of a vehicle during a parking maneouvre.

As required, detailed embodiments are disclosed herein. However, it is to be understood that the disclosed embodiments are merely exemplary and embodiments may take various and alternative forms. The figures are not necessarily to scale. Some features may be exaggerated or minimized to show details of particular components. Therefore, specific structural and functional details disclosed herein are not to be interpreted as limiting, but merely as a representative basis for teaching one skilled in the art to variously employ the present disclosure.

The disclosure will now be described with reference to embodiments and the appended drawings. With initial reference to FIG. 1, there is shown a schematical drawing with a top view of a vehicle 1 which is in the process of initiating a parking manoeuvre in a parking space 2. For this reason, the vehicle 1 is driven in reverse by a driver (not shown). Consequently, the direction of travel of the vehicle 1 is indicated by means of an arrow 3. Also, the parking space 3 is limited by a fixed object, in this case schematically represented by another vehicle 4 which is parked in an adjacent parking space as indicated in FIG. 1.

According to an embodiment, the vehicle 1 is equipped with a number of detector units 5 which are positioned in the rear portion of the vehicle 1 and which are configured for determining the distance to the object 4 (i.e. the adjacent vehicle). The detector units 5 are suitably in the form of ultrasonic proximity detectors which are configured for providing a measurement related to the proximity of any object being positioned behind the vehicle 1. More precisely, ultrasonic signal pulses from each detector unit 5 are emitted and reflected off said object and transmitted to a control unit 6 being positioned in the vehicle 1 and configured for determining a value d of the distance between the parking vehicle 1 and the adjacent vehicle 4. The control unit 6 may comprise a combination of analog and digital circuits, and/or one or more processors and associated memory configured with software and/or firmware that when executed by the one or more processors perform the various functions and/or operations described herein. Such processors and/or other digital hardware may be included in a single ASIC (Application-Specific Integrated Circuitry), or several processors and various digital hardware may be distributed among several separate components, whether individually packaged or assembled into a SoC (System-on-a-Chip). The technology behind ultrasonic detectors used for parking assist systems is generally known as such, and for this reason it is not described in greater detail here.

Although not shown in FIG. 1, the vehicle 1 can also be provided with one or more detector units positioned in the front section or along the side sections of the vehicle 1. The purpose with such detector units is also to determine the distance to any object being positioned in close vicinity to the vehicle.

Furthermore, and in order to assist the driver during the reverse parking maneouvre, the vehicle 1 is equipped with alarm units configured to be activated when certain conditions are fulfilled. Such conditions generally correspond to a situation when the vehicle 1 has moved toward the adjacent vehicle 4 so that the distance d between the vehicle is less than at least a predetermined threshold value $d_1$. This will be described in greater detail below.

According to an embodiment, the alarm units being provided on the vehicle 1 are in the form of a loudspeaker 7, a vibratory unit 8 being associated with a steering wheel 9, and a light signal unit 10. The alarm units 7, 8, 10 are connected to and controllable by the control unit 6. As will be described below, the loudspeaker 7 is arranged in the vehicle 1 passenger compartment and is configured for emitting audio signals upon activation by means of the control unit 6. Also, the vibratory unit 8 is arranged, upon actuation by the control unit 6, so as to generate vibrations in the steering wheel 9 which can be sensed by the driver of the vehicle 1. Finally, the light signal unit 10 is arranged for generating light signals, if suitable, in order to add visual signals as an addition to the sound and vibratory signals.

The intention with all these signals is to alert the driver and to warn of the urgency of a situation, for example during reverse parking, in which there is a risk that the vehicle 1 collides with another object.

Although not shown in detail in the drawings, the vehicle 1 is also equipped with a driveline and a gearbox, wherein the control unit is configured for detecting when a reverse gear is selected in the gearbox. This constitutes an indication that the vehicle is running in reverse and that a reverse parking maneouvre is being initiated. This means that the control unit 6 can be activated in a manner so as to use the detector units 5 to detect the proximity of the adjacent vehicle 4.

As mentioned initially, the disclosure is particularly intended for assisting a driver during a reverse parking maneouvre by generating an alarm signal in a manner which is more user-friendly and intuitive for human ergonomics than prior art solutions. In this manner, a reverse parking procedure can be less stressful to a driver. In this manner, the driver is less likely to become involved in an incident involving a collision with a nearby object such as an adjacent vehicle.

When the control unit 6 has detected that the parking maneouvre has been initiated, the detector units 5 are actuated to transmit ultrasonic signals, which will be emitted towards the adjacent vehicle 4 and reflected back towards the detector units 5. The control unit 6 is then arranged to calculate the distance d between the moving vehicle 1 and the adjacent vehicle 4 based on the time which has lapsed between the emission and receipt of these ultrasonic pulses.

If the distance d between the moving vehicle 1 and the adjacent vehicle 4 is less than a first threshold value $d_1$, a alarm signal is generated. According to an embodiment, the alarm signal is generated at least as an audio signal and is preferable generated as a sequence of signal stages as said distance d decreases. In particular, a first signal stage is generated in the form of a combination of an audio signal and a vibratory signal which causes vibrations in a steering wheel 9 in the moving vehicle 1, and a second signal stage is generated in the form of an audio signal gradually increasing in volume as the distance d between the moving vehicle 1 and the adjacent vehicle 4 decreases. The first signal stage corresponds to an "enter reverse parking" mode of operation of the vehicle 1 whereas the second signal stage corresponds to an "ongoing reverse parking" mode of operation. Also, the second signal stage is initiated when the distance d between the moving vehicle 1 and the adjacent vehicle 4 is lower than a second threshold value $d_2$, which is less than the first threshold value $d_1$.

According to an embodiment, the first signal stage is formed as a relatively light and brief vibratory signal in the steering wheel 9 to communicate that the vehicle 1 is in the "enter reverse parking" mode. After the vibratory signal, an audio signal in the form of a relatively low volume beep is generated, in particular to indicate to the driver that the vehicle 1 is in motion.

Also, the second signal stage is formed as an audio signal in the form of a tone with gradually increasing volume and treble, so as to indicate that the moving vehicle 1 comes closer and closer to the adjacent vehicle 4. Preferably, the audio signal will not increase in tempo. Also, the audio signal during the second signal stage will be generated with a gradually decreasing level of reverb as the distance d decreases. Reverb, or reverberation, is the term used to indicate that a particular sound is added to an original sound and maintains or persists after the original sound itself has stopped. A typical sound with a high amount of reverb is generated while talking or generating other forms of sound in a large hall such as a church where the sound will be reflected by the walls so as to generate the reverb component of the sound. Consequently, the reverb sound gives rise to a "tail" of sound with gradually decreasing volume. The amount of reverb and the decay time, i.e. the time during which the reverb is maintained while decreasing in volume, are important parameters to describe a sound to which reverb has been added.

According to an embodiment, the alarm signal consequently includes a second signal stage with a certain level of reverb which gradually decreases as the distance d decreases.

According to an embodiment, the alarm signal may optionally include a third signal stage which corresponds to a "necessary to stop" mode of operation of the moving vehicle 1, i.e. a final stage in which it is necessary to stop the moving vehicle 1 in order to avoid a collision with the adjacent vehicle 4. The third optional signal stage is initiated when the distance between the moving vehicle 1 and the adjacent vehicle 4 is less than a third predetermined threshold value $d_3$, which is less than the second threshold value $d_2$. According to the embodiment, the third signal stage is in the form of a combination of a vibratory signal causing vibrations in the steering wheel 9 and an audio signal being of higher volume than during the above-mentioned first signal stage. Suitably, the vibratory signal is relatively long and is supplemented with relatively high volume beep in order to communicate that it is necessary to stop immediately.

In summary, according to the embodiment, the disclosure is based on an alarm signal which at least comprises two signal stages, indicating "enter reverse parking" and "ongoing reverse parking", respectively. Optionally, a third signal stage can be used, which indicates a "necessary to stop" mode of operation.

According to an embodiment, there is generated an audio signal having a reverse reverb during a time period immediately before the third signal stage. The term "reverse reverb" refers to a reverb sound which is generated in the customary manner but which is played back in a reverse manner. This means that the reverse reverb sound begins with the "tail", gradually increasing in volume (since it is played backwards), and ending with the initial part of the reverb signal. After the audio signal with the reverse reverb has finished, there will be a brief moment of silence until the above-mentioned third signal stage is initiated with its long vibration supplemented with a relatively loud warning beep which communicates that it is necessary to stop the vehicle 1 immediately.

It has been found that the alarm signal as described above is perceived as more pleasant and distinct than prior art solutions, and is consequently more user-friendly, intuitive and safe than known solutions.

According to an embodiment, the alarm signal described above can be combined with a ight signal, or other type of visual signal, to indicate that said alarm signal is generated. In such case, the light signal unit 10 is actuated.

An embodiment of the disclosure will now be further described with reference to FIG. 2, which is a flow chart explaining the operation of the disclosure in a typical case of parking with the vehicle 1. The process for generating an alarm signal during reverse parking, as described with reference to FIG. 1, is initiated when the control unit 6 detects a condition indicating that the vehicle 1 is operated in reverse. This is suitably carried out by detecting that the reverse gear has been selected in the gearbox (step 11 in FIG. 2).

Figure 2:
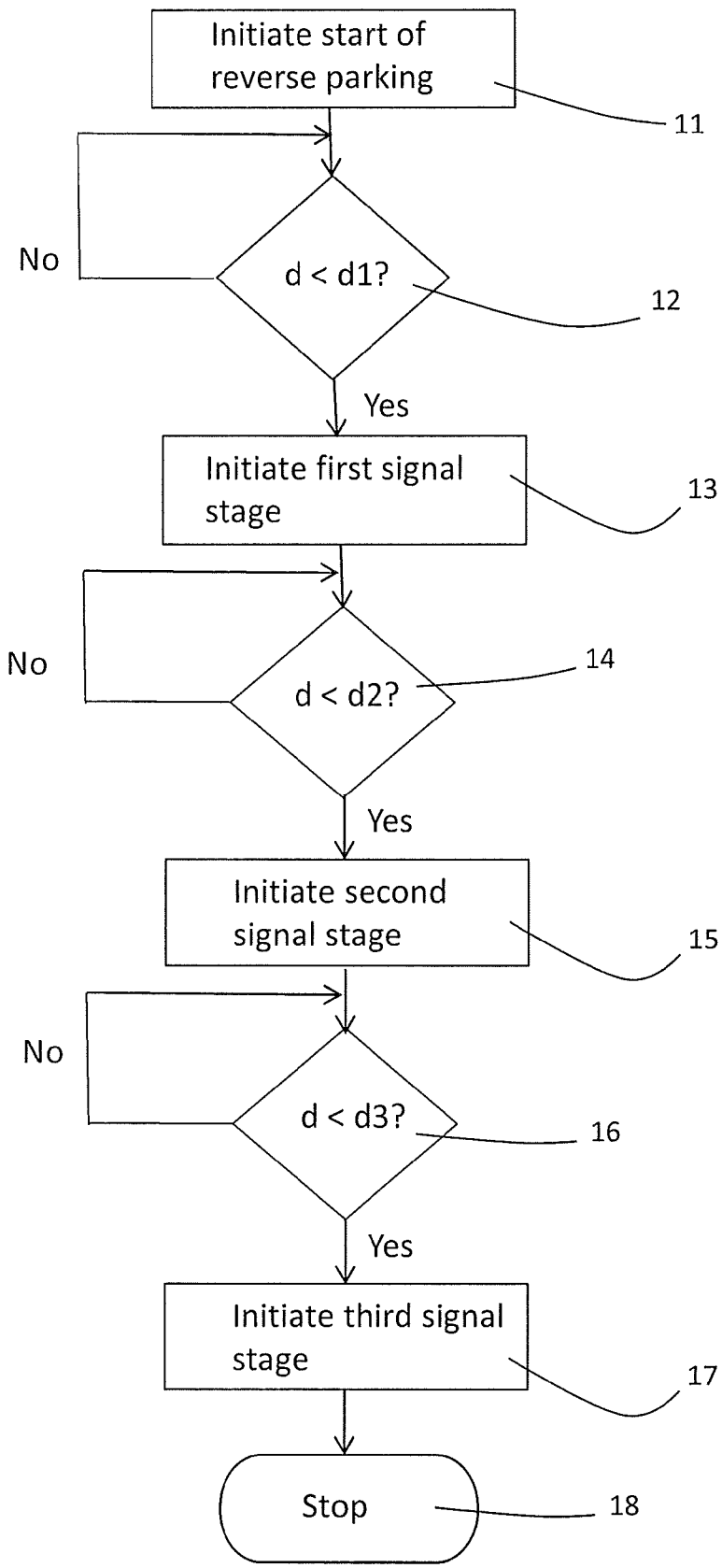
FIG. 2 shows a simplified flow chart explaining the operation of the disclosure.

As mentioned above, the control unit 6 is configured for determining the distance d between the moving vehicle 1 and the adjacent vehicle 4, and the control unit 6 is also configured for determining when the distance d is less than a predetermined first threshold value $d_1$ (step 12 in FIG. 2). If this is the case, the first signal stage of the alarm signal is initiated (step 13).

As the reverse parking procedure continues, the distance d will decrease. The control unit 6 is configured for detecting whether the distance d becomes less than the second threshold $d_2$ (step 14). If this is the case, the second signal stage of the alarm signal is initiated (step 15).

As mentioned above, an optional step is to generate a third signal stage if the distance should be lower than the third threshold value $d_3$. For this reason, the control unit 6 may check whether the distance d is lower than said third threshold value $d_3$ (step 16). If this is the case, the third signal stage is generated (step 17). It is then expected that the vehicle 1 will come to a halt. After that, the process is terminated (step 18).

It is to be understood that the present disclosure is not limited to the embodiments described above and illustrated in the drawings; rather, the skilled person will recognize that many changes and modifications may be made within the scope of the appended claims.

For example, the term "alarm unit" comprises both sound, light and vibratory alarm devices. Also, the system may include light signals or other visual signals provided by a display or similar, to indicate the distance to an object. The system may also include a display showing the vehicle on a screen and including a representation of the nearby objects as suitable graphical symbols.

Furthermore, the detector units can be of other types than ultrasonic units, for example electromagnetic detectors.

The disclosure can be used not only during parking maneouvres, but also during other situations in which there is a need to generate an alarm signal if the vehicle is too close to an adjacent object.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments.

What is claimed is:

1. A method for generating an alarm signal in a vehicle for indicating that the vehicle is in the proximity of an object, the method comprising:
   detecting a degree of proximity to the object;
   calculating a value of a distance (d) between the vehicle and the object;
   generating the alarm signal at least as an audio signal when the distance (d) is less than a predetermined first threshold value ($d_1$); and
   generating the alarm signal in the form of a sequence of signal stages as the distance (d) decreases;
   wherein a first signal stage is generated in the form of a combination of an audio signal and a vibratory signal causing vibrations in a steering wheel in the vehicle, a second signal stage is generated in the form of an audio signal gradually increasing in volume and treble, and with a gradually decreasing level of reverb, as the distance (d) between the vehicle and the object decreases, and a third signal stage is generated in the form of a combination of a vibratory signal causing vibrations in the steering wheel and an audio signal being of higher volume than during the first signal stage.

2. The method of claim 1 further comprising generating the first signal stage in the form of a brief vibratory signal combined with an audio signal in the form of a relatively low volume beep.

3. The method of claim 1 further comprising:
   generating the signal stages in a manner wherein the first signal stage is initiated when the distance (d) is less than the first threshold value (d1), and the second signal stage is initiated when the distance (d) is less than a second threshold value ($d_2$), which is lower than the first threshold value ($d_1$).

4. The method of claim 1 further comprising generating the third signal stage comprising a continuous vibratory signal combined with an audio signal in the form of a relatively high volume beep.

5. The method of claim 4 further comprising initiating the third signal stage when the distance (d) is less than a third threshold value ($d_3$) which is less than the first threshold value ($d_1$) and the second threshold value ($d_2$).

6. The method of claim 1 further comprising generating an audio signal having a reverse reverb during a time period immediately before the third signal stage.

7. The method of claim 1 further comprising initiating a light signal to indicate that the alarm signal is generated.

8. The method of claim 1 further comprising allowing the alarm signal to be generated upon detection of the vehicle being driven in reverse.

9. A system for generating an alarm signal in a vehicle for indicating that the vehicle is in the proximity of an object, the system comprising:
- at least one detector unit configured for detecting a degree of proximity to the object; and
- a control unit configured for calculating a value of a distance (d) between the vehicle and the object and for generating the alarm signal in at least an audible manner if the distance (d) is less than a predetermined first threshold value ($d_1$);
- wherein the control unit is configured for generating a first signal stage in the form of a combination of an audio signal and a vibratory signal causing vibrations in a steering wheel in the vehicle, a second signal stage in the form of an audio signal gradually increasing in volume and treble, and with a gradually decreasing level of reverb, as the distance (d) between the vehicle and the object decreases, and a third signal stage in the form of a combination of a vibratory signal causing vibrations in the steering wheel and an audio signal being of higher volume than during the first signal stage.

10. The system of claim 9 further comprising alarm units for generating the alarm signal in the form of a sequence of signal stages as the distance (d) decreases.

11. The system of claim 10 wherein the alarm units comprise at least a loudspeaker and a vibration unit.

12. A vehicle comprising a system according to claim 9.

13. A non-transitory computer readable medium having computer executable instructions stored thereon for performing the method of claim 1.

14. A control unit for generating an alarm signal in a vehicle for indicating that the vehicle is in the proximity of an object, the control unit configured to perform the method of claim 1.

* * * * *